United States Patent
Kawabe et al.

[11] Patent Number: 6,027,130
[45] Date of Patent: Feb. 22, 2000

[54] FRONT SUSPENSION OF MOTOR VEHICLE

[75] Inventors: Yoshihiro Kawabe; Tamiyoshi Kasahara, both of Kanagawa, Japan

[73] Assignee: Nissan Motor Co., Ltd., Yokohama, Japan

[21] Appl. No.: 09/173,688

[22] Filed: Oct. 16, 1998

[30] Foreign Application Priority Data

Oct. 31, 1997 [JP] Japan .................................. 9-300588

[51] Int. Cl.⁷ .................................................... B60G 3/20
[52] U.S. Cl. ........................... 280/124.135; 280/93.512; 280/124.138; 280/124.145
[58] Field of Search ...................... 280/124.135, 124.138, 280/124.145, 124.136, 124.139, 124.141, 124.143, 93.512, 124.146, 124.154

[56] References Cited

U.S. PATENT DOCUMENTS

| | | | |
|---|---|---|---|
| 4,753,455 | 6/1988 | Murakami et al. | 280/124.135 |
| 5,048,859 | 9/1991 | Nishikuma et al. | 280/93.512 |
| 5,048,860 | 9/1991 | Kanai et al. | 280/93.512 |
| 5,346,241 | 9/1994 | Lee | 280/124.135 |
| 5,868,410 | 2/1999 | Kawabe et al. | 280/124.15 |
| 5,873,587 | 2/1999 | Kawabe et al. | 280/124.135 |
| 5,938,219 | 8/1999 | Hauami et al. | 280/124.135 |

FOREIGN PATENT DOCUMENTS 5-178041  7/1993  Japan .
9-86124  3/1997  Japan .

Primary Examiner—Christopher P. Ellis
Attorney, Agent, or Firm—Foley & Lardner

[57] ABSTRACT

A steering knuckle has an upper portion and a lower portion. A lower link has an outside end rotatably connected to the lower portion of the steering knuckle and an inside end swingably supported by a vehicle body. A connecting member is rotatably mounted to the upper portion of the steering knuckle. A first axis (Lk) is defined about which the connecting member rotates relative to the upper portion of the steering knuckle. A shock absorber has an upper end pivotally connected to the vehicle body and a lower end connected to the connecting member. An upper link has an inside end pivotally connected to the vehicle body and an outside end pivotally connected to the connecting member. A second axis (Lu) is defined which passes through both the pivoted inside end of the upper link and the pivoted outside end of the same. A tie rod is connected to the steering knuckle to pivot the same about the first axis. The lower link and the upper link are arranged to exhibit a negative camber characteristics upon bounding, and the shock absorber is supported by the connecting member in a manner to pivot about a third axis (Ls). The third axis (Ls) is inclined with respect to a longitudinal axis of the vehicle in such a manner that a lateral distance of the third axis from the longitudinal axis increases as the third axis extends rearward.

9 Claims, 14 Drawing Sheets

FRONT SUSPENSION OF MOTOR VEHICLE

BACKGROUND OF THE INVENTION

1. Field of the Invention

The present invention relates in general to suspensions of wheels of motor vehicles, and more particularly to front suspensions for front wheels of the motor vehicles.

2. Description of the Prior Art

For clarifying the task of the invention, one known front suspension will be described, which is disclosed in Japanese First Provisional Publication 5-178041.

In the known front suspension, a lower end of a steering knuckle is connected through two lower links to the vehicle body in such a manner that the steering knuckle can swing up and down. A connecting member is connected to an upper portion of the steering knuckle in such a manner as to pivot horizontally, that is, to rotate about a vertical axis. The connecting member is connected to a lower end of a shock absorber so that the connecting member can swing up and down together with the steering knuckle. An inside end of an upper link is pivotally connected to the vehicle body. An outside end of the upper link is branched into two portions which are pivotally connected to the connecting member, so that the upper link can swing up and down. The connecting member is so arranged that an axis thereof is positioned inside an imaginary king pin axis. With this arrangement, the front suspension possesses both an advantage of a strut type suspension and that of a double wishbone type suspension.

SUMMARY OF THE INVENTION

In general, in front suspensions, when the wheel center is shifted rearward in response to bound stroke, the ride quality is improved, and when the ground contact point corresponding point "GCPCP", which moves together with the wheel supporting member, is shifted forward in response to the bound stroke, the vehicle posture change upon braking is lowered, that is, a so-called anti-dive effect is obtained. (It is to be noted that the ground contact point corresponding point "GCPCP" is a point of a wheel which has just contacted to the ground before the bounding.) Accordingly, to achieve both of these advantages (viz., improved ride quality and anti-dive effect), the front suspension has to possess such an arrangement as to shift the wheel center rearward and shift the ground contact point corresponding point forward in response to the bound stroke. That is, to achieve these two advantages, there is a need of turning the wheel supporting member in a direction to increase the caster angle (as viewed from the side of the vehicle) upon a bound stroke.

In the above-mentioned known front suspension, there is employed an arrangement wherein a connecting shaft for connecting the shock absorber and the connecting member extends along the longitudinal axis of the vehicle. However, this arrangement tends to bring about the following undesired phenomena.

That is, in order to increase the turning degree (as viewed from the side of the vehicle) of the wheel supporting member in response to the bound stroke, it is necessary to change the inclination (as viewed from the side of the vehicle) of the lower link or shock absorber. In particular, when the rearward shifting of the wheel center upon bounding is further needed, it becomes necessary to largely incline the head portion of the shock absorber rearward. The turning degree of the wheel supporting member may be increased when the lower portion of the lower link is raised. However, in this case, the rearward shifting of the wheel center upon bounding is not achieved and thus the ride quality becomes poor. These necessities tend to narrow the freedom in designing the layout of parts of the vehicle body, particularly, the layout of the parts in the engine room.

Furthermore, if the shock absorber is arranged to be largely inclined, reduction of the lever ratio tends to occur and the friction resistance generated by the shock absorber upon wheel stroke tends to increase, which makes the ride quality poor.

Since the inclination of the shock absorber becomes much increased upon the bounding, the turning degree of the wheel supporting member is further increased. Accordingly, in this case, the front suspension tends to have a so-called non-linear characteristics wherein the forward movement of the ground contact point corresponding point at bounding is much increased, and thus the anti-dive effect is increased. However, when the front suspension has such a characteristic, the vehicle posture change is forced to appear quickly at the initial stage of braking. In this case, the vehicle posture change is suddenly suppressed after making a certain vehicle posture change, which makes the driver pressing the brake pedal uncomfortable.

Furthermore, since the caster trail is increased together with the turning of the wheel supporting member, the caster trail is increased non-linearly in response to the bound stroke. This induces increase of the steering force needed upon turning of the vehicle, and thus, the steering information and steering feeling tend to lower.

Thus, the present invention aims to provide a wheel suspension for a front wheel of a motor vehicle, which is free of the above-mentioned drawbacks.

It is an object of the present invention to provide a wheel suspension for a front wheel of a motor vehicle, which can reduce the vehicle posture change upon braking as well as improve the ride quality of the vehicle.

It is another object of the present invention to provide a wheel suspension for a front wheel of a motor vehicle, which can minimize the uncomfortable feeling caused by the vehicle posture change upon braking as well as improve the steering feeling upon turning of the vehicle.

According to the present invention, there is provided a wheel suspension for a front wheel of a motor vehicle having a vehicle body. The wheel suspension comprises a wheel supporting member rotatably supporting the front wheel, the wheel supporting member having an upper portion and a lower portion; a lower link having an outside end rotatably connected to the lower portion and an inside end swingably supported by the vehicle body; a connecting member mounted on the upper portion of the wheel supporting member in such a manner as to rotate relative to the upper portion about a first axis ($L_K$), the first axis ($L_K$) being a king pin axis; a shock absorber having an upper end pivotally connected to the vehicle body and a lower end connected to the connecting member; an upper link having an inside end pivotally connected to the vehicle body and an outside end pivotally connected to the connecting member, the upper link defining a second axis (Lu) which passes through both the pivoted inside end of the upper link and the pivoted outside end of the same; and a tie rod connected to the wheel supporting member to pivot the same about the first axis (Lk), wherein the lower link and the upper link are arranged to exhibit negative camber characteristics upon bounding, and wherein the shock absorber is supported by the connecting member in a manner to pivot about a third axis (Ls), the third axis (Ls) being inclined with respect to a longitudinal axis of the vehicle in such a manner that a lateral distance of the third axis from the longitudinal axis increases as the third axis extends rearward.

DETAILED DESCRIPTION OF THE EMBODIMENTS

In the following, embodiments of the present invention will be described in detail with reference to the drawings.

Throughout the description, the terms "front", "rear", "left", "right", "inside", "outside", "longitudinal", "lateral" and the like are to be understood with respect to a motor vehicle to which the present invention is practically applied.

Figure 1:
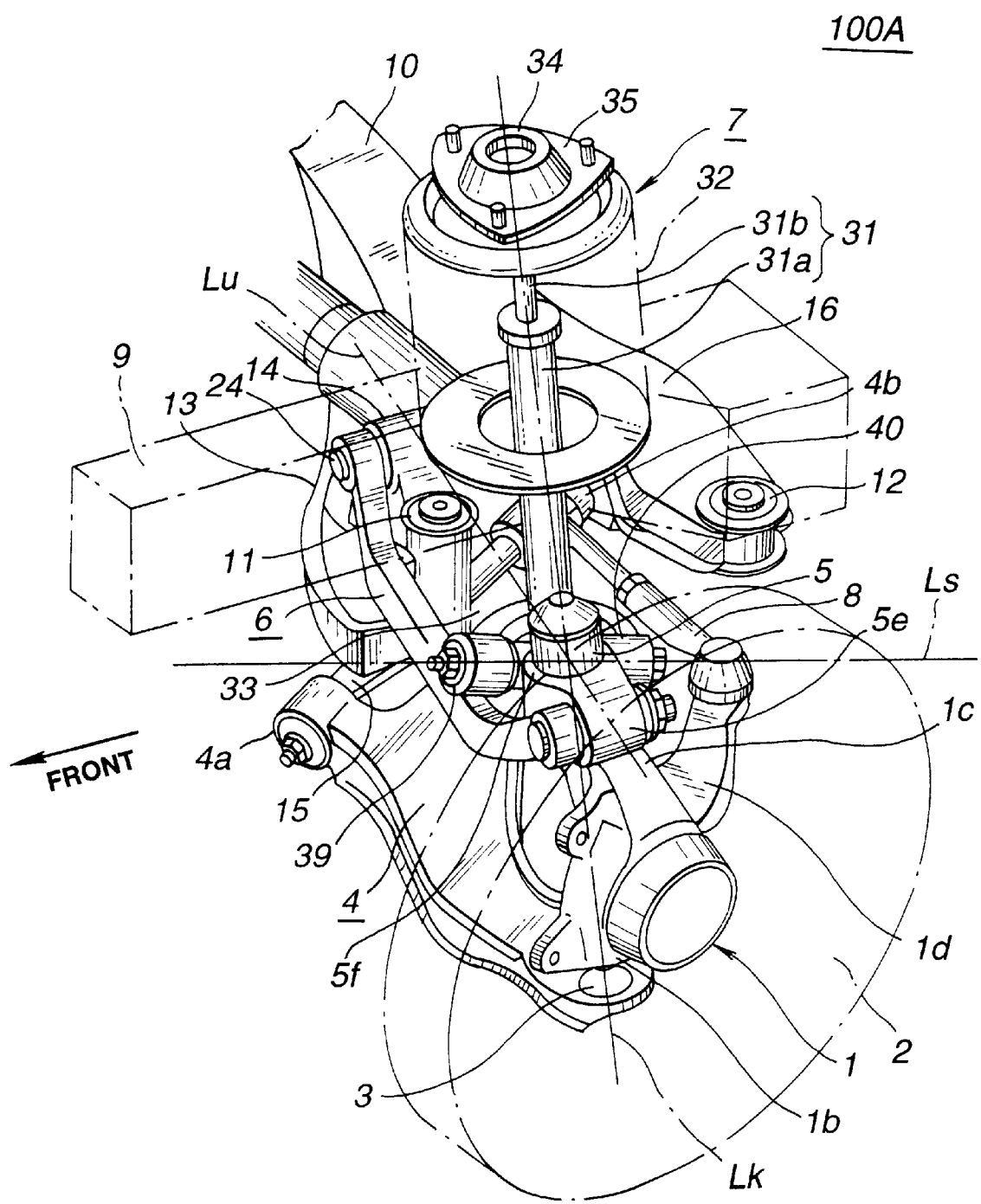
FIG. 1 is a perspective view of a front suspension which is a first embodiment of the present invention.
Figure 2:
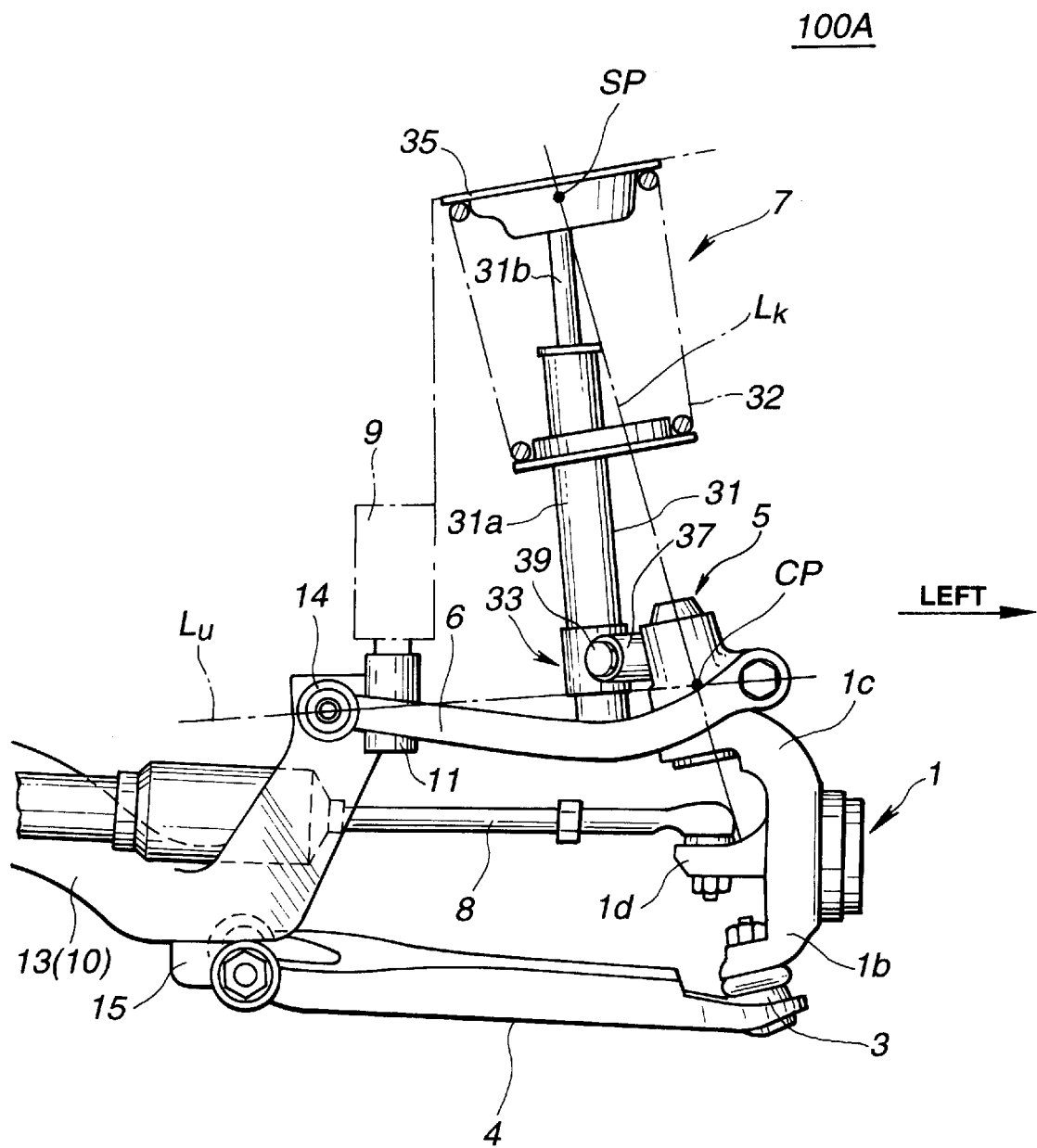
FIG. 2 is a front view of the front suspension of the first embodiment, which is taken from the front of an associated motor vehicle.

Referring to FIGS. 1 and 2, particularly FIG. 1, there is shown a front suspension 100A which is a first embodiment of the present invention.

In the drawings, denoted by numeral 1 is a steering knuckle (or wheel supporting member) which rotatably supports a front wheel 2. The steering knuckle 1 has at a center portion thereof a cylindrical bore 1a through which an axle of the front wheel 2 passes. To a lower portion 1b of the steering knuckle 1, there is connected a lower link 4 through a ball-joint 3. To an upper portion 1c of the steering knuckle 1, there are connected through a rotatable connecting member 5 both an upper link 6 and a strut 7. To a supporting portion 1d which projects rearward from a center portion of the knuckle 1, there is connected a tie rod 8 which is connected to a steering device (not shown).

A side member 9 extends in a longitudinal direction of the vehicle inside the steering knuckle 1. To a lower surface of the side member 9, there is connected through resilient bushes 11 and 12 a suspension member 10 which extends in the lateral direction of the vehicle.

The outside end of the suspension member 10 is branched into two, that is, front and rear-portions 13 and 16. As is understood from FIGS. 2 and 1, the front portion 13 is raised upward and has the resilient bush 11 connected thereto. The front portion 13 has at an inside portion of the resilient bush 11 a supporting portion 14 which supports the upper link 6. The front portion 13 has further at an inside portion of the supporting portion 14 and below the same another supporting portion 15 which supports the lower link 4. As is seen from FIG. 1, the rear portion 16 has at a leading end the resilient bush 12 connected thereto.

As is best seen from FIG. 2, the lower link 4 extends in the lateral direction of the vehicle. An outside end of the lower link 4 is connected through the ball-joint 3 to the lower end 1b of the steering knuckle 1. While, an inside portion of the lower link 4 is branched into two portions which are connected through respective resilient bushes 4a and 4b (see FIG. 1) to spaced portions of the supporting portion 15 of the suspension member 10. The lower link 4 is shaped like letter "A" when viewed from the above. The lower link 4 thus allows a vertical movement or bounding/rebounding movement of the steering knuckle 1, but retains a longitudinal movement of the same.

As is seen from FIGS. 1 and 2, the rotatable connecting member 5 is connected to the upper end 1c of the steering knuckle 1 and coaxially arranged on a king pin axis "Lk" (or first axis) which passes through both a center of the ball-joint 3 and a body connecting point "SP" at which an upper end of a piston rod 31b of an after-mentioned shock absorber 31 is connected to the vehicle body.

Figure 5:
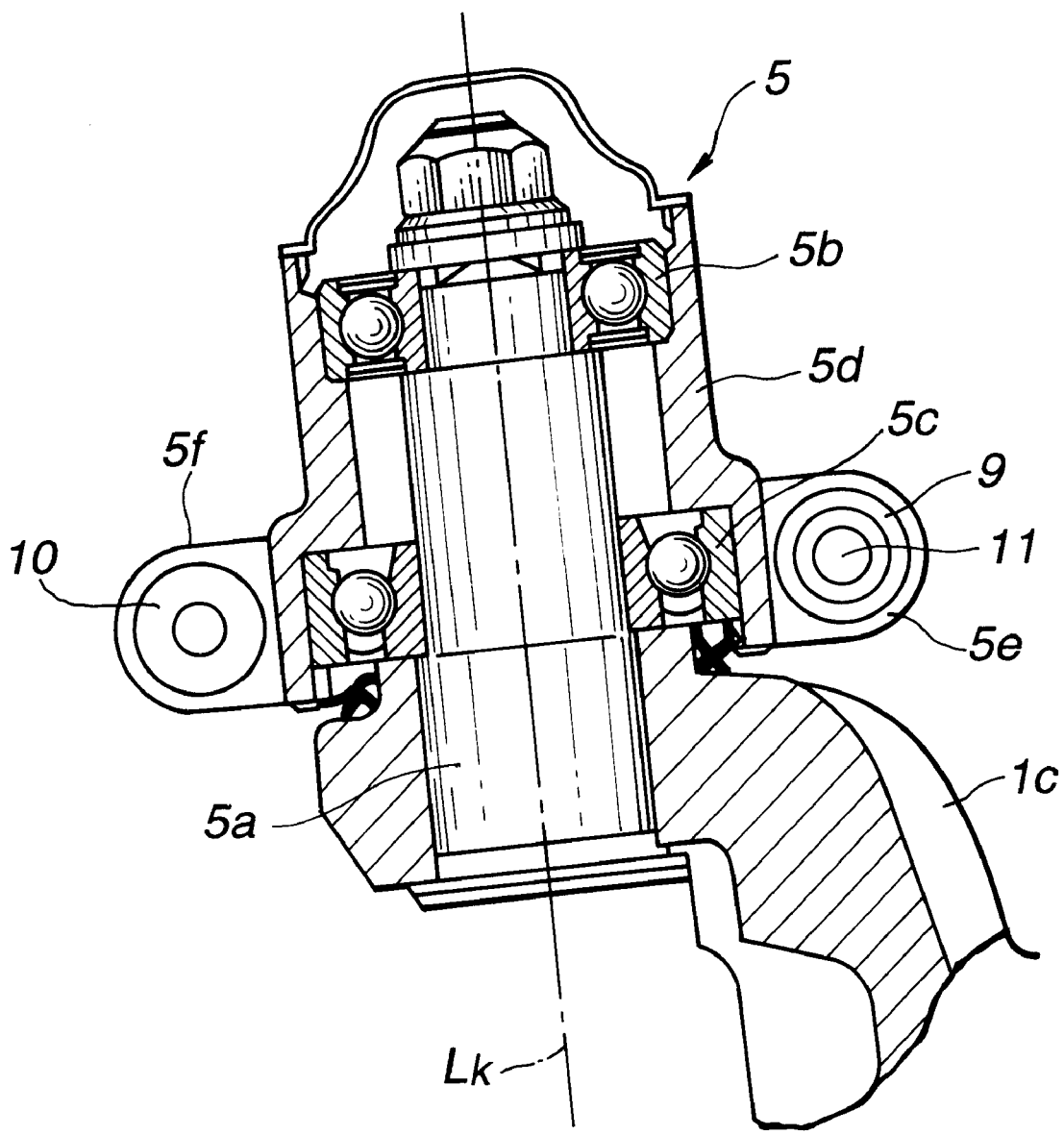
FIG. 5 is a sectional view of a rotatable connecting member employed in the front suspension of the first embodiment.

As is seen from FIG. 5, the rotatable connecting member 5 comprises a stepped supporting shaft 5a which is mounted on the upper end 1c in a manner to be coaxial with the king pin axis "Lk", and a cylinder 5d which is rotatably supported by the supporting shaft 5a through upper and lower bearings 5b and 5c. The cylinder 5d is formed at an-outside part thereof with a first cylindrical supporting portion 5e (see FIG. 1) and at an inside part thereof with a second cylindrical supporting portion 5f.

Figure 6:
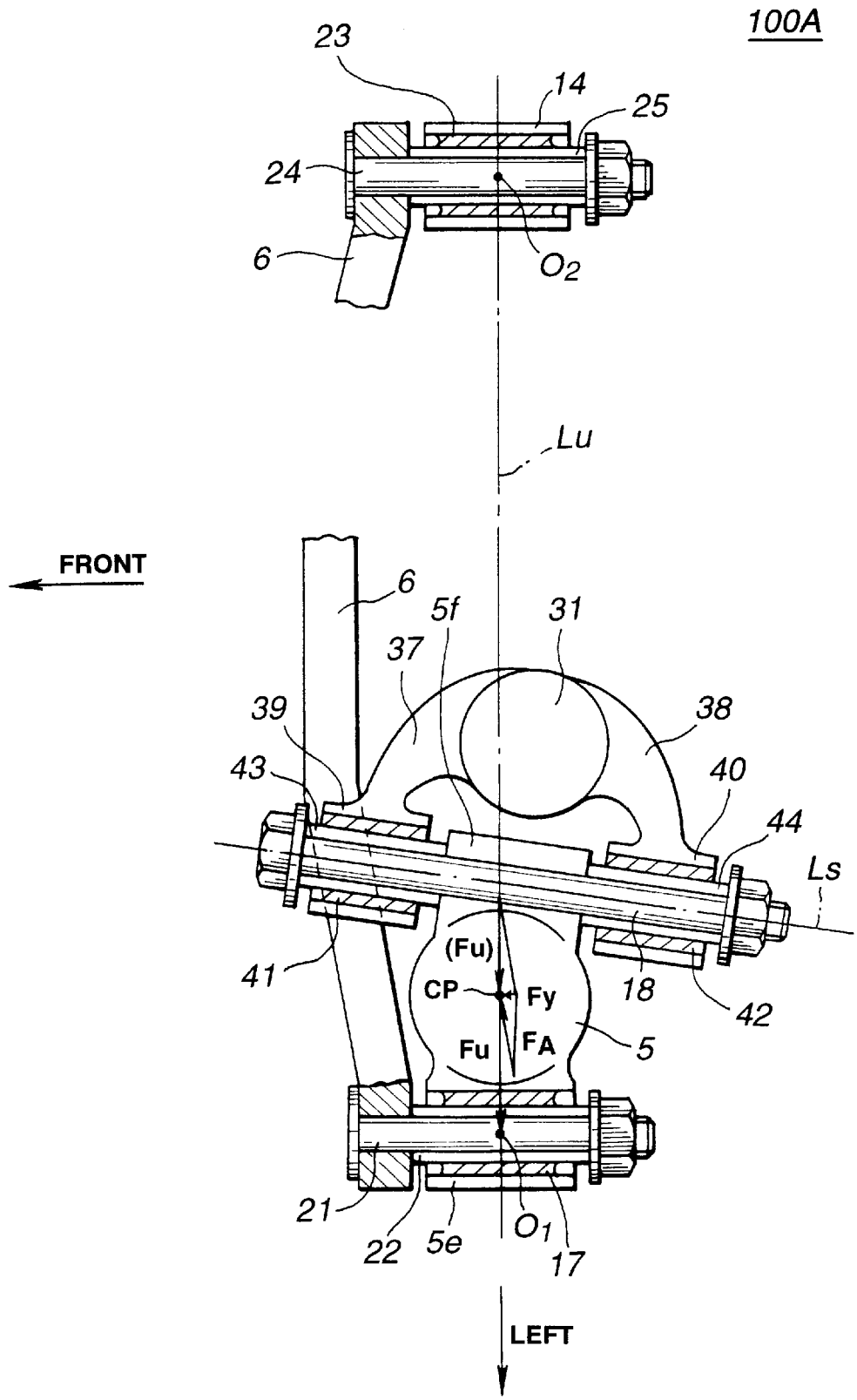
FIG. 6 is a plan view showing a positional relationship between essential parts employed in front suspension of the first embodiment.

As is seen from FIG. 6, the first cylindrical supporting portion 5e is so arranged and oriented that an axis thereof extends in a direction perpendicular to an after-mentioned link axis "Lu" (or second axis) of the upper link 6, and the second cylindrical supporting portion 5f is so arranged and oriented that an axis "Ls" (or third axis) thereof extends in a direction angled to the link axis "Lu" of the upper link 6.

More specifically, the axis "Ls" inclines with respect to the longitudinal axis of the vehicle in such a manner that a lateral distance of the axis "Ls" from the longitudinal axis increases as the axis "Ls" extends rearward. These first and second cylindrical supporting portions 5e and 5f support the upper link 6 and the strut 7 respectively. As shown, the first cylindrical supporting portion 5e has a resilient bush 17 installed therein, and the second cylindrical supporting portion 5f has a rotatable supporting shaft 18 rotatably held thereby with both ends exposed. The rotatable supporting shaft 18 supports the strut 7.

As is seen from FIGS. 1 and 2, the upper link 6 is in the form of letter "I", which has an outside end connected to the rotatable connecting member 5 and an inside end connected to an inside member of the vehicle body. That is, as is seen from FIG. 6, the outside end of the upper link 6 is provided with a rearwardly extending shaft 21 about which the resilient bush 17 of the rotatable connecting member 5 is disposed through a cylindrical collar 22. While, the inside end of the upper link 6 is provided with a rearwardly extending shaft 24 about which a resilient bush 23 is disposed through a cylindrical collar 25. As is understood from FIGS. 1 and 2, the resilient bush 23 is installed in the supporting portion 14 of the suspension member 10.

As is seen from FIG. 6, the link axis "Lu" is an axis passing through both a rotation center "$O_1$" of the resilient bush 17 and that "$O_2$" of the resilient bush 23. Each rotation center "$O_1$" or "$O_2$" is an axially center portion of the resilient bush 17 or 23 which is not moved even when the bush 17 or 23 is applied with a torque.

Figure 4:
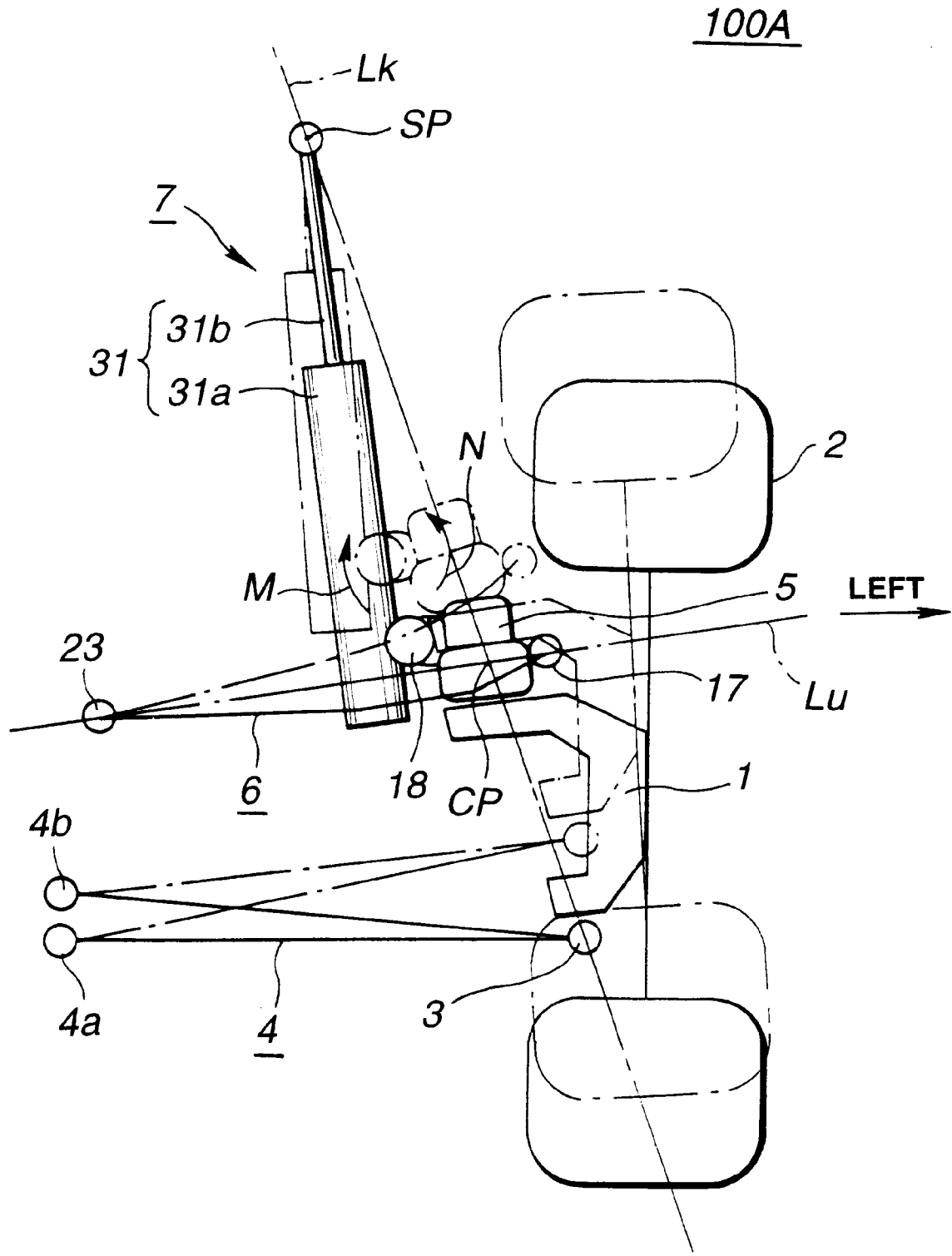
FIG. 4 is a schematic front view of the front suspension of the first embodiment, taken from the front of the vehicle.

As is seen from FIGS. 2 and 4, the link axis "Lu" intersects with the king pin axis "Lk" at a given point "CP".

As is seen from FIGS. 1 and 6, the upper link 6 is arranged at a forwardly offset position with respect to the link axis "Lu". This means that the upper link 6 extends laterally in front of the rotatable connecting member 5. As is seen from FIGS. 1, 2 and 6, the upper link 6 extends below a cylindrical supporting portion 39 of an after-mentioned connecting bracket 33 for the strut 7, and as is understood from FIGS. 1 and 2, the upper link 6 extends below the side member 9. Furthermore, as is seen from FIGS. 1 and 6, the upper link 6 is so angled relative to the longitudinal axis of the vehicle so that the outside end of the upper link 6 is positioned forward with respect to the inside end of the same.

As is understood from FIGS. 1 and 2, the outside end of the upper link 6 connected to the rotatable connecting member 5 is neatly received in an inside portion of the wheel 2, which can increase the length of the upper link 6 by a certain degree. That is, due to this arrangement, the upper link 6 can have substantially the same length as the lower link 4 and thus, the camber characteristics upon wheel stroke can be linearized.

As is seen from FIG. 4, the lower link 4 and the upper link 6 are so arranged that a vertical span between inside ends of the links 4 and 6 is shorter than that of the outside ends of the same. With this arrangement, the front suspension exhibits negative camber characteristics upon bounding and exhibits a positive chamber characteristic upon rebounding.

As is seen from FIGS. 1 and 2, the strut 7 generally comprises a shock absorber 31 and a coil spring 32 disposed about the absorber 31. The shock absorber 31 comprises a cylinder 31a which has at its lower end the connecting bracket 33 connected thereto, and a piston rod 31b which projects upward from the cylinder 31a and has an upper end connected to a portion of the vehicle body through a mount rubber 34 and a mount plate 35.

Figure 7:
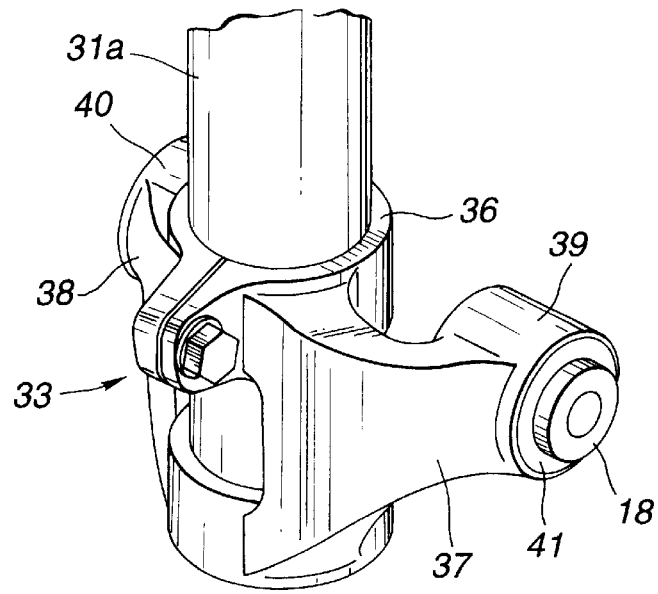
FIG. 7 is a perspective view of a connecting bracket for connecting a shock absorber.

As is seen from FIG. 7, the connecting bracket 33 comprises a cylindrical base portion 36 which is bolted to the lower end of the cylinder 31a, two arm portions 37 and 38 which extend laterally outward from the base portion 36, cylindrical supporting portions 39 and 40 which are respectively defined by leading ends of the arm portions 37 and 38, resilient bushes 41 and 42 (see FIG. 6) respectively installed in the cylindrical supporting portions 39 and 40, and cylindrical collars 43 and 44 respectively installed in the resilient bushes 41 and 42.

As is seen from FIGS. 5 and 6, the cylindrical supporting portions 39 and 40 are coaxially aligned having the second cylindrical supporting portion 5f of the rotatable connecting member 5 coaxially interposed between the two supporting portions 39 and 40. The above-mentioned rotary supporting shaft 18 passes through the cylindrical collar 43, the bore of the second cylindrical supporting portion 5f and the other cylindrical collar 44. With this, as is seen from FIGS. 1 and 3, the connecting bracket 33 can pivot relative to the rotatable connecting member 5 about an axis of the rotary supporting shaft 18, that is, about the axis "Ls".

As has been mentioned hereinabove, the axis "Ls" is the axis of the second cylindrical portion 5f of the rotatable connecting member 5, which inclines in such a manner that the lateral distance of the axis "Ls" from the longitudinal axis of the vehicle increases as the axis "Ls" extends rearward.

As is seen from FIG. 2 which is taken from a front position of the vehicle, the front suspension 100A of the first embodiment has not only a construction of a double wishbone type including the lower link 4 and the upper link 6 but also that of a strut type including the strut 7. This means that the front suspension possesses both the advantages of these two types.

That is, as is easily understood from FIG. 2, the movement of the front wheel 2 and the steering knuckle 1 caused by a wheel stroke is restricted by the lower and upper links 4 and 6 as viewed from the front thereof, like in case of the double wishbone type suspension, whereas the movement is restricted by the lower link 4 and the shock absorber 31 as viewed from the side thereof, like in case of the strut type suspension.

Likewise, as for a force inputted to the front wheel 2, a longitudinally inputted force (viz., longitudinal force) is received by the lower link 4 and the strut 7 like in case of the strut type suspension, whereas a laterally inputted force (viz., lateral force) is received by the lower and upper links 4 and 6 like in case of the double wishbone type suspension.

Accordingly, as is seen from FIG. 4 which is taken from the front of the vehicle, when the front suspension is subjected to a bound stroke as is shown by a phantom line, the steering knuckle 1 exhibits a negative camber characteristics. This is because the vertical span between the inside ends of the lower and upper links 4 and 6 is shorter than that of the outside ends of the links 4 and 6.

Accordingly, a lower portion of the shock absorber 31 is slightly pulled inside causing a change of inclination of the shock absorber 31. Upon this, at the connecting portion between the shock absorber 31 and the rotatable connecting member 5, the shock absorber 31 is slightly rotated about the axis "Ls" in a clockwise direction "M" and the rotatable connecting member 5 is slightly rotated about the axis "Ls" in a counterclockwise direction "N "

Figure 3:
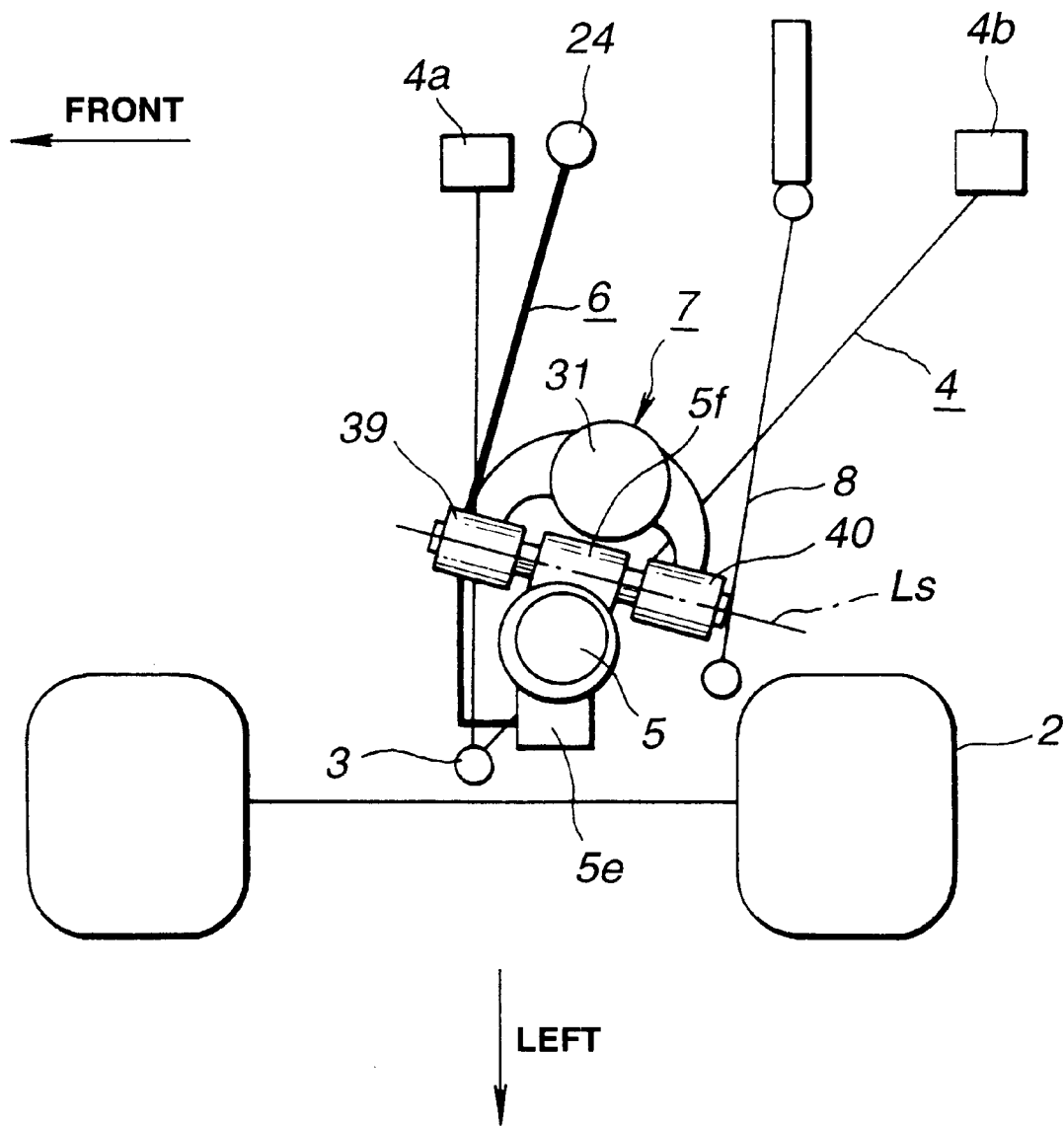
FIG. 3 is a schematic plan view of the front suspension of the first embodiment, taken from the above of the associated vehicle.

As is seen from FIGS. 3 and 6, the axis "Ls" inclines with respect to the longitudinal axis of the vehicle in such a manner that a lateral distance of the axis "Ls" from the longitudinal axis increases as the axis "Ls" extends rearward. Thus, when the axis "Ls" makes a parallel displacement toward the longitudinal axis of the vehicle, the axis "Ls" is inevitably shifted rearward.

Figure 8:
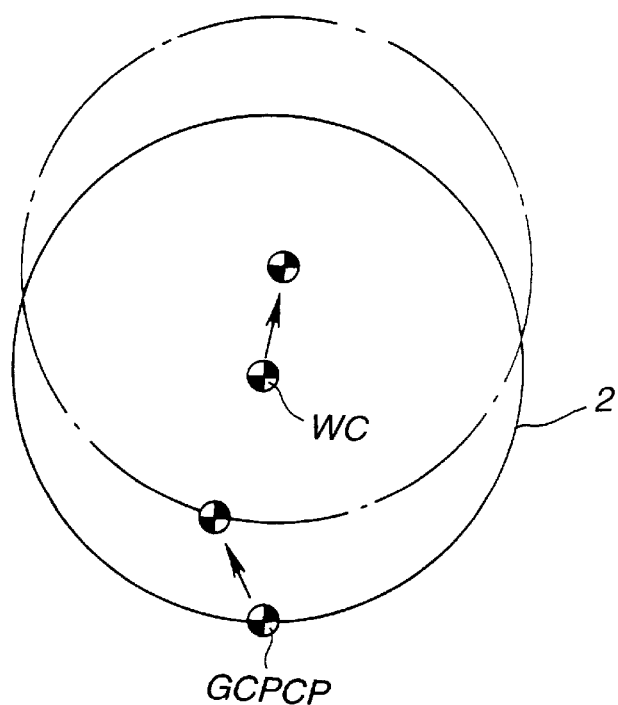
FIG. 8 is an illustration showing traces drawn by a wheel center and a ground contact point corresponding point upon bounding, in the first embodiment.

Accordingly, as is seen from FIG. 8, when the front suspension is subjected to a bound stroke, a center "WC" of the wheel 2 is shifted rearward upward, and at the same time, a ground contact point corresponding point "P" is shifted forward upward, which causes the steering knuckle 1 to turn in a direction to increase the caster angle as viewed from the side of the vehicle.

Due to the above-mentioned turning of the steering knuckle 1, without changing the connecting position of the front suspension to the vehicle body, there is induced an advantageous effect substantially equal to that produced when the inclination of the shock absorber 31 (viz., the strut 7) as viewed from the side of the vehicle is increased. That is, an anti-dive effect and an improvement in ride quality which is induced when the wheel center "WC" is shifted rearward at the bound strike are both obtained at the same time.

It is to be noted that in the present embodiment 100A, there is no need of increasing the inclination of the shock absorber 31, and thus, the lever rate of the shock absorber 31 is not lowered. In the above-mentioned conventional front suspension, the inclination of the strut 7 is increased when the front suspension is subjected to a bound stroke. While, in the present embodiment 100A, upon the bound stroke of the front suspension, the inclination of the strut 7 is reduced and the lever rate of the shock absorber 31 is increased because the connecting portion between the strut 7 and the rotatable connecting member 5 is shifted rearward. Thus, the over stroke is reduced and thus the effective length of the wheel stroke is increased. Furthermore, the shock absorber 31 does not increase its friction upon the wheel stroke, and thus the ride quality of the vehicle is improved.

Furthermore, since the connection portion where the upper link 6 and the rotatable connecting member 5 are connected is positioned laterally outside of the connection portion where the rotatable connecting member 5 and the steering knuckle 1 (viz., wheel supporting member) are connected, the length of the upper link 6 can be increased by a certain degree. More specifically, due to this arrangement, the upper link 6 can have substantially the same length as the lower link 4. Thus, the camber characteristics upon wheel stroke can be linearized. Accordingly, respective variations of camber characteristics possessed by inside and outside wheels under steering can be both reduced, which improves a steering performance of the vehicle. Furthermore, since the twisting between the shock absorber 31 (viz., the strut 7) and the rotatable connecting member 5 about the axis "Ls" is linearly changed in response to the wheel stroke, the rotation of the steering knuckle 1 (viz., wheel supporting member) as viewed from the side, that is, the caster changing is carried out in a linear manner as is indicated by a characteristic solid line in FIG. 9. Thus, the forward/rearward displacement of the ground contact point corresponding point of the steering knuckle 1 upon the wheel stroke is carried out in a linear manner. Accordingly, as is indicated by a characteristic solid line in FIG. 10, the anti-dive effect, which can reduce the posture change upon braking, is improved and thus a drive can brake the vehicle with a stable posture and a comfortable brake feeling.

Due to the rotation of the steering knuckle 1, the caster trail is increased. However, due to reduction of the non-linearity of the rotation, the non-linearity of the caster trail is also reduced, so that steering of the vehicle is carried out with a comfortable steering feeling. It is to be noted that if the non-linearity of the caster tail is increased, the force needed by the driver for steering the vehicle is suddenly increased upon turning and/or bound stroke of the vehicle, which makes the driver uncomfortable.

Figure 9:
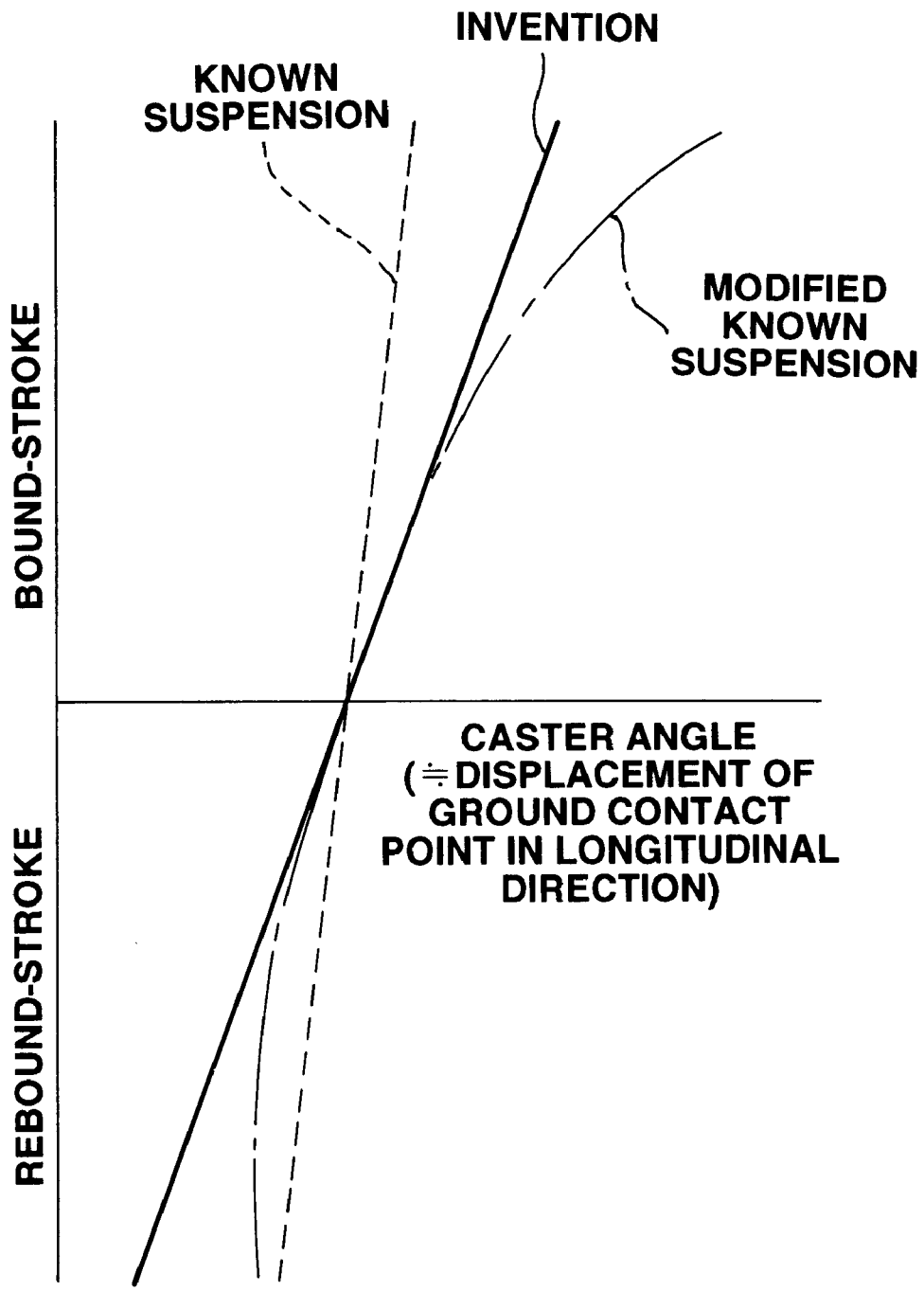
FIG. 9 is a graph showing a relationship between a wheel stroke and a caster angle.
Figure 10:
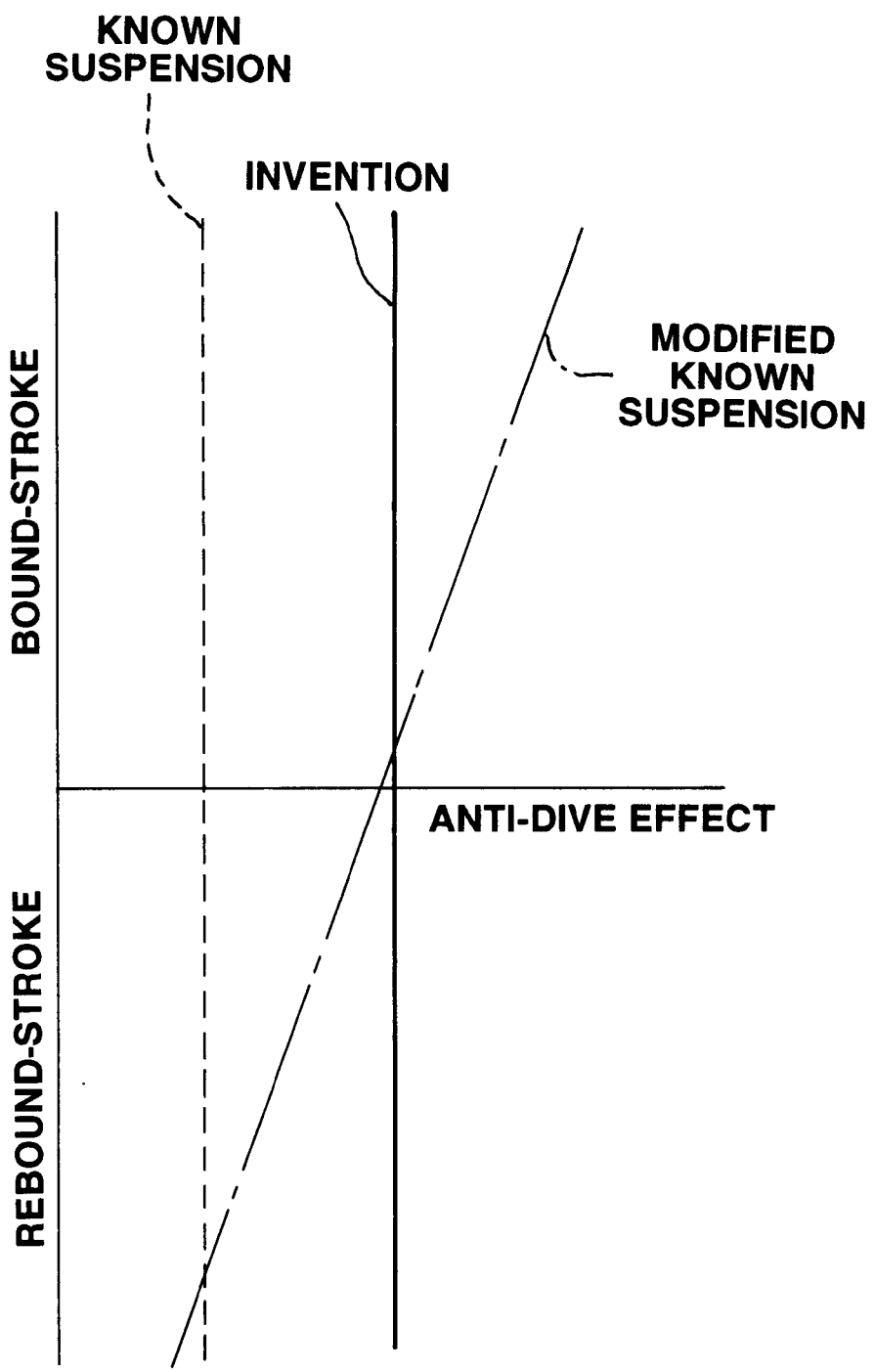
FIG. 10 is a graph showing a relationship between a wheel stroke and an anti-dive effect.

If, like in case of the conventional front suspension, the axis about which the connecting portion of the strut pivots is arranged to extend generally along the longitudinal axis of the vehicle, the variation of the caster angle upon wheel stroke is small as is indicated by a characteristic broken line in FIG. 9 and the anti-dive effect is small as is indicated by a characteristic broken line in FIG. 10. If the inclination angle of the strut is increased in case of the conventional front suspension, the variation of the caster angle upon wheel stroke becomes nonlinear as is indicated by a characteristic phantom curve in FIG. 9 and the anti-dive effect is increased linearly under stroke from the rebound side to the bound side, as is indicated by a characteristic phantom line in FIG. 10. Thus, the driver is forced to feel uncomfortable upon braking the vehicle.

When, upon turning of the vehicle or the like, a lateral force is applied from a road surface to the front wheel 2 in a direction toward the inside of the vehicle, the steering knuckle 1 receives the lateral force. Under this condition, a lower portion of the steering knuckle 1 is suppressed from making a displacement in a direction of the width of the vehicle due to presence of the lower link 4, so that the lateral force is transmitted to the rotatable connecting member 5 arranged on the upper portion of the steering knuckle 1. With this, as is seen from FIG. 5, the lateral force "$F_A$" is applied to the king pin axis "Lk". Since the rotary supporting shaft 18 about which the strut 7 is rotated is arranged to extend generally along the longitudinal axis of the vehicle, the strut 7 produces substantially no resistance against the lateral force "$F_A$".

However, as is seen in FIG. 5, the upper link 6 can produce on the link axis "Lu" a marked resistance "Fu" against the lateral force "$F_A$". As is mentioned hereinabove, the link axis "Lu" is the axis passing through both the rotation center "$O_1$" of the resilient bush 17 and that "$O_2$" of the resilient bush 23. Since the upper link 6 is of the I-shaped link having one end connected to the vehicle body and the other end connected to rotatable connecting member 5, and the link axis "Lu" intersects with the king pin axis "Lk" at the given point "CP", only a compression axial tension and/or extension axial tension is applied to the link axis "Lu" except a negligibly small force produced by the twisting of the resilient bushes 17 and 23. Accordingly, there is produced no angular moment by which the rotatable connecting member 5 is rotated about the rotation axis "Lk" of the rotatable connecting member 5, and only a longitudinal force "Fy" produced due to inclination of the link axis "Lu" relative to the direction of the width of the vehicle is applied to the rotatable connecting member 5. The longitudinal force "Fy" is received by the strut 7 rotatably supported by the rotatable connecting member 5, like the longitudinal force applied to the front wheel 2. Accordingly, even when the upper link 6 and the rotatable connecting member 5 are connected at only one point, any lowering of the camber resiliency and lateral resiliency is not induced.

In the conventional front suspension, due to presence of an axial tension of the upper link and a force inputted from the steering knuckle to the rotatable connecting member, there is inevitably produced an angular moment for rotating the rotatable connecting member. For bearing this angular moment, in the conventional technique, it is needed to connect the upper link to the rotatable connecting member in a manner to allow pivoting the upper link only about the longitudinal axis of the vehicle, that is, it is needed to connect the upper link and the rotatable connecting member by two points.

Figure 11:
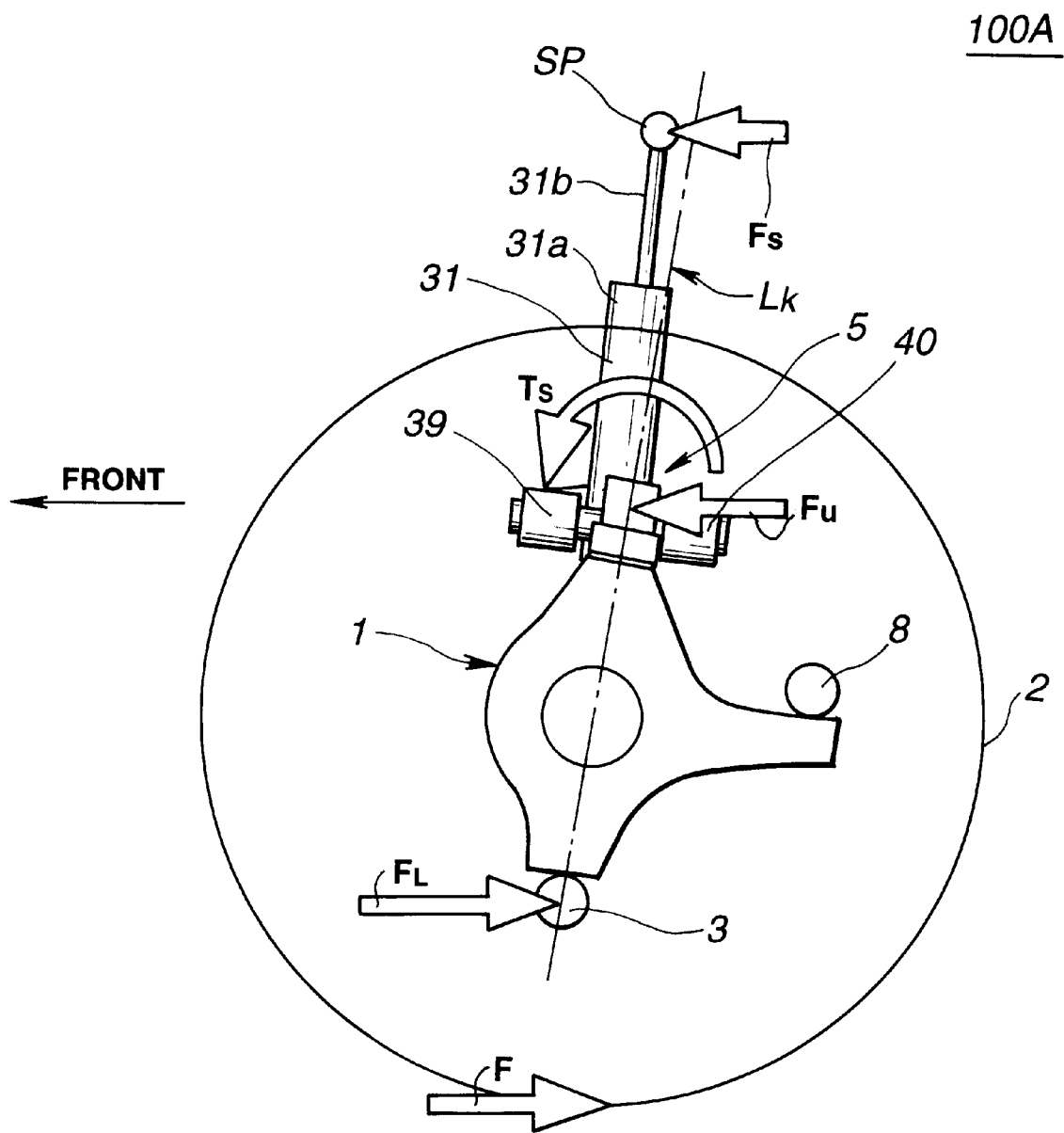
FIG. 11 is a schematic side view of the front suspension of the first embodiment, depicting various actions which take place when an external force is applied thereto from a ground in a front direction.

While, as is seen from FIG. 11, in the present invention, when the front wheel 2 has a certain longitudinal force inputted thereto from the road surface due to braking of the vehicle by a driver, engine braking (in case of front drive vehicle), a rough surface of the road, etc., the steering knuckle 1 transmits the longitudinal force to the lower link 4 via the ball-joint 3 and to the rotatable connecting member 5.

In this case, due to connection of the lower link 4 to the vehicle body at two points which are spaced in the longitudinal direction, the lower link 4 produces a reaction force "$F_L$" against the longitudinal force.

The rotatable connecting member 5 has both the upper link 6 and the shock absorber 31 connected thereto. Since the upper link 6 has both the laterally outside end connected to the rotatable connecting member 5 through the resilient bush 17 and the laterally inside end connected to the suspension member 10 through the resilient bush 23, the upper link 6 produces only a small reaction force by the resilient bushes 17 and 23 against the longitudinal force "$F_U$" inputted to the rotatable connecting member 5 from the steering knuckle 1. Specifically, the small reaction force is produced when the resilient bushes 17 and 23 are twisted.

As is seen from FIG. 6, the shock absorber 31 is connected to the rotatable connecting member 5 in a manner to pivot about the axis of the longitudinally extending shaft 18. Thus, the rotatable connecting member 5 transmits the longitudinal force "$F_U$" inputted thereto from the steering knuckle 1 to the shock absorber 31 as a corresponding torque "Ts", as shown.

The shock absorber 31 and the rotatable connecting member 5 can pivot about the axis of the stepped supporting shaft 5a of the rotatable connecting member 5, that is, about the king pin axis "$L_K$". Thus, the input force "$F_U$" from the rotatable connecting member 5 is applied in the longitudinal direction of the vehicle against the axis "$L_K$".

As is understood from FIGS. 2 and 4, the king pin axis "$L_K$" passes through the connecting point "SP" defined between the shock absorber 31 and the vehicle body as viewed from the front of the vehicle. Thus, the input force "$F_U$" from the rotatable connecting member 5 is applied through the shock absorber 31 to the connecting point "SP" as a longitudinal force "Fs" without producing angular moment.

Accordingly, the upper portion of the steering knuckle 1 is supported by the reaction force "Fs" which is produced when the shock absorber 31 and the mount rubber 34 are loaded. Thus, any lowering of the camber rigidity, which tends to occur when the rotatable connecting member 5 and the shock absorber 31 rotate, is not induced.

Figure 12:
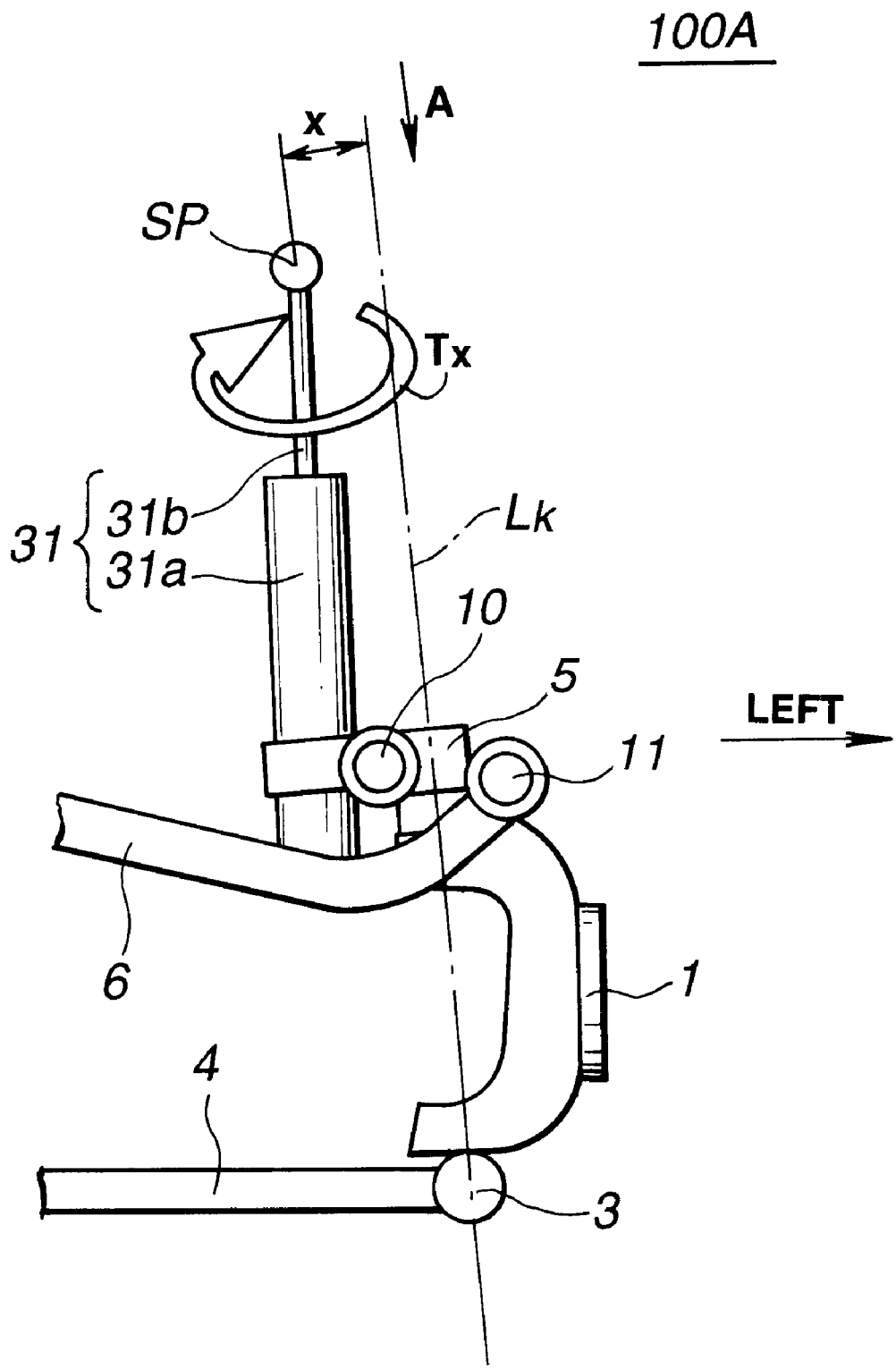
FIG. 12 is a schematic front view of the front suspension of the first embodiment, showing a case wherein a rotation axis of the rotatable connecting member does not pass through a portion where the shock absorber is connected to the vehicle body.
Figure 13:
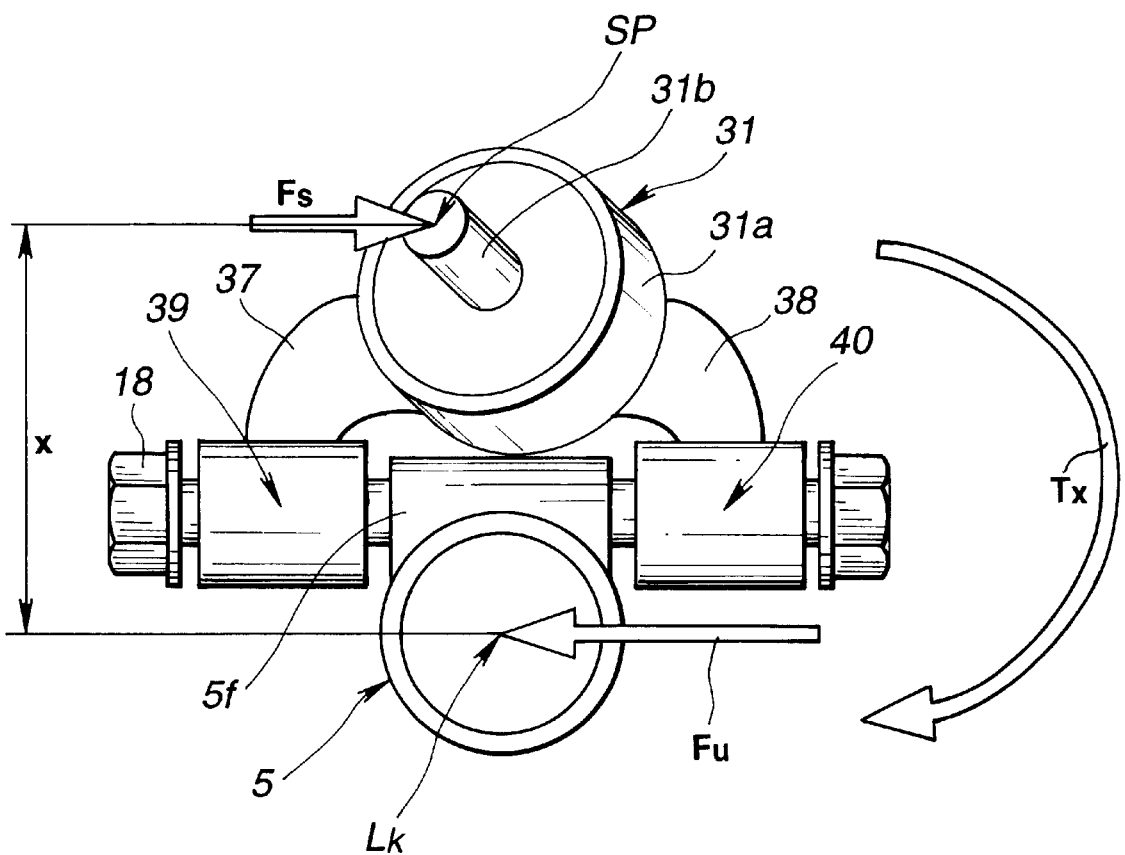
FIG. 13 is a plan view of the front suspension of FIG. 12, which is taken along the rotation axis of the rotatable connecting member.

In order to much clarify the advantageous operation of the front suspension of the invention, an arrangement wherein the rotation axis "$L_K$" does not pass through the connecting point "SP" as viewed from the front of the vehicle will be described with reference to FIGS. 12 and 13.

That is, in such arrangement, the longitudinal force "$F_U$" (see FIG. 13) inputted to the rotatable connecting member 5 causes generation of a certain torque "Tx" to rotate both the rotatable connecting member 5 and the shock absorber 31 about a standing axis passing through the point "SP", the torque "Tx" being determined in accordance with an amount "x" of offset between the connecting point "SP" and the rotation axis "$L_K$" of the rotatable connecting member 5 as viewed from the front of the vehicle. Due to generation of such torque "Tx", both the rotatable connecting member 5 and the shock absorber 31 are forced to rotate about the standing axis thereby moving the upper portion of the steering knuckle 1, resulting in that the camber rigidity is lowered. While, in the invention, there produced substantially no torque corresponding to the torque "Tx".

As is described hereinabove, in the present invention, the rotation axis "$L_K$" is arranged to pass through the body connecting point "SP" of the shock absorber 31 as viewed from the front of the vehicle. Thus, any lowering of the camber rigidity, which tends to occur when a longitudinal force is inputted to the front wheel 2, is not induced. Thus, the upper link 6 and the rotatable connecting member 5 can be connected at one point without lowering the driving stability of the vehicle, together with a possible reduction in weight and cost of the front suspension.

Further, since the upper link 6 is connected at its laterally outside end to the laterally outside supporting portion 5e of the rotatable connecting member 5, the length of the upper link 6 can be increased, resulting in improved durability of the resilient bushes 17 and 23 and the linearity of chamber changing phenomenon.

Further, since the supporting portion 5e (see FIG. 6) by which the upper link 6 is connected to the rotatable connecting member 5 is arranged to extend perpendicular to the link axis "$L_U$", deformation of the resilient bush 17 is reduced or minimized and thus the camber rigidity and the lateral rigidity can be appropriately balanced.

When, due to bounding/rebounding, the front wheel 2 and thus the steering knuckle 1 is applied with a vertical force, a reaction force out of the strut 7 acts to maintain a force balance so long as the upper link 6 does not interfere with the side member 9. At that time, as for a torque produced due to offset of the king pin axis "$L_K$" with respect to the strut 7, a force balance is maintained due to the fact that the rotatable connecting member 5 and the steering knuckle 1 are connected to each other about the substantially vertical supporting shaft 5a. While, as for a small torque for rotating the rotatable connecting member 5 about the king pin axis "$L_K$", a force balance is maintained by the reaction force at the upper link 6 as described hereinabove.

The rotatable connecting member 5 is so arranged that the rotation axis "$L_K$" thereof passes through the ball-joint 3 by which the lower link 4 and the steering knuckle 1 are connected. This means that the rotation axis "$L_K$" is coincident with the king pin axis "$L_K$" which passes through both the center of the ball-joint 3 and the body connecting point "SP" of the shock absorber 31.

Thus, upon turning of the front wheel 2, the steering knuckle 1 is permitted to make smooth turning about the axis "$L_K$" inducing a certain displacement of the lower link 4, the upper link 6 and the strut 7. Thus, resilient bushes incorporated with these parts 4, 6 and 7 are suppressed from suffering needless deformation.

In the above-mentioned first embodiment 100A, the rotation axis "$L_K$" of the rotatable connecting member 5 intersects with the link axis "$L_U$" of the upper link 6 at the intersection point "CP" and passes through the body connecting point "SP" of the shock absorber 31. However, the present invention is not limited to such arrangement. That is, even if the intersection point "CP" is slightly displaced due to manufacturing tolerance or the like thereby to fail to produce a real intersection point between the two axes "$L_U$" and "$L_K$", or even if the rotation axis "$L_K$" is slightly displaced from the body connecting point "SP" of the shock absorber 31 for example by about 30 mm to 40 mm (which is determined with respect to the rigidity of the bushes and the steering knuckle 1), the provision of the resilient bush 17 between the upper link 6 and the rotatable connecting member 5 can effectively absorb a moment inevitably produced due to the displacement. That is, such moment is absorbed by pinching resiliency of the bush 17, so that substantially same effect as that of the above-mentioned first embodiment 100A are obtained. Since the resilient bush 17 is so arranged that the axis thereof extends perpendicular to the link axis "$L_U$" of the upper link 6, deformation of the bush 17 produced upon application of an axial tension to the upper link 6 can be minimized and thus the camber rigidity and the lateral rigidity can be appropriately balanced. This advantageous effect is achieved even if the right angle intersection is not strictly made between the bush 17 and the link axis "$L_U$".

In the above-mentioned first embodiment 100A, the rotation axis "$L_K$" of the rotatable connecting member 5 passes through the center of the ball-joint 3 by which the lower link 4 and the steering knuckle 1 are connected. However, the present invention is not limited to such arrangement. That is, the rotation axis "$L_K$" may be slightly displaced from the center of the ball-joint 3.

In the above-mentioned embodiment 100A, the upper link 6 is arranged to extend below the supporting portion 39 for the strut 7. However, if desired, the upper link 6 may extend above the supporting portion 39.

In the above-mentioned embodiment 100A, the upper link 6 is arranged at a forward offset position with respect to the link axis "$L_U$". However, if desired, the upper link 6 may be arranged at a rearward offset position with respect to the link axis "$L_U$".

In the above-mentioned embodiment 100A, the connection of the upper link 6 to both the rotatable connecting member 5 and the suspension member 10 is made by the resilient bushes 17 and 23. However, if desired, ball-joints may be used in place of the resilient bushes 17 and 23. In that case, a center of a ball of the ball-joint forms a pivoting center, and a line interconnecting the pivoting centers of the ball-joints respectively connected to inside and outside ends of the upper link 6 forms the link axis "$L_U$".

In the above-mentioned first embodiment 100A, the lower link 4 is a single member shaped like character "A".

Figure 14:
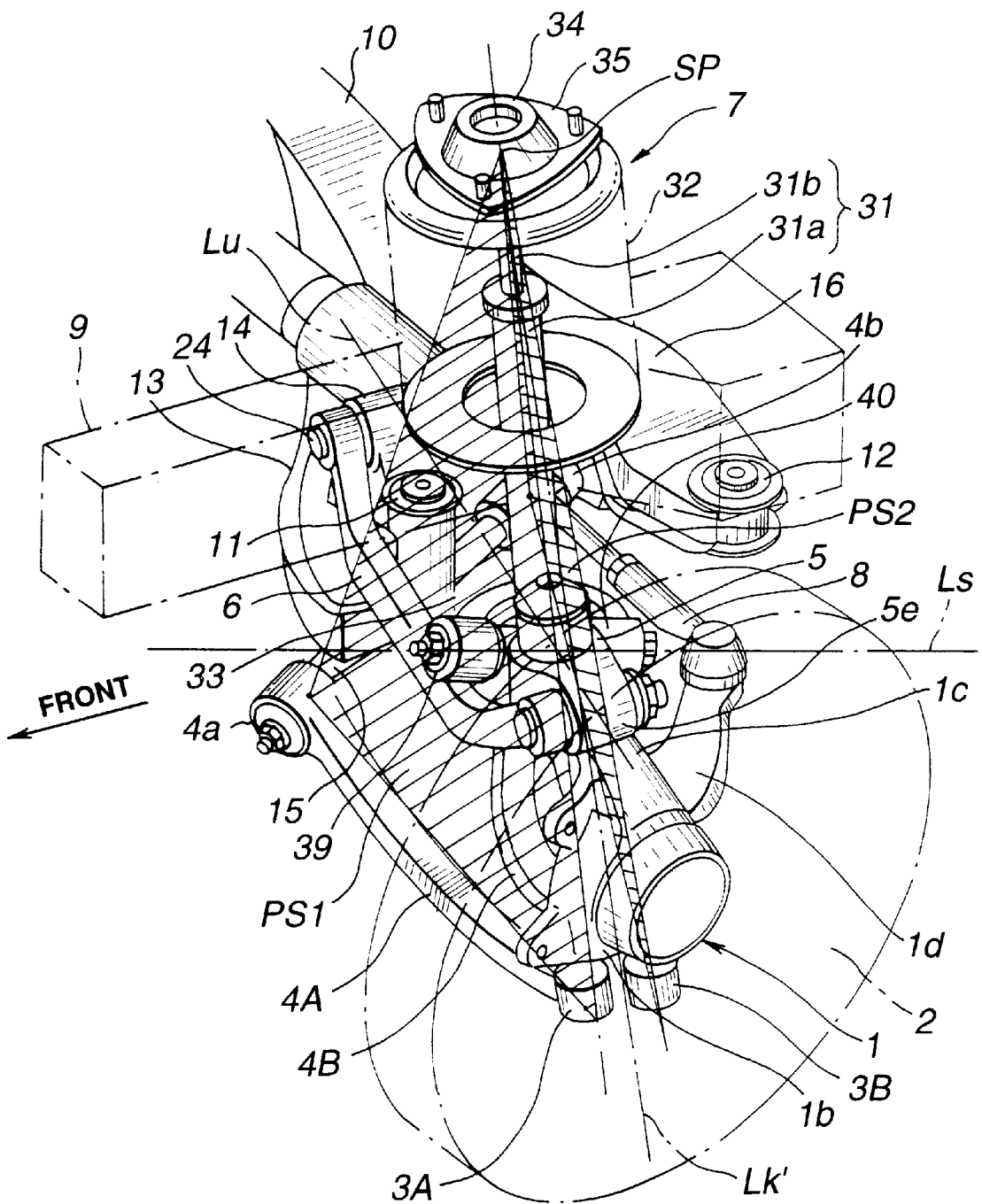
FIG. 14 is a perspective view of a front suspension which is a second embodiment of the present invention, wherein two lower links are employed.
Figure 15:
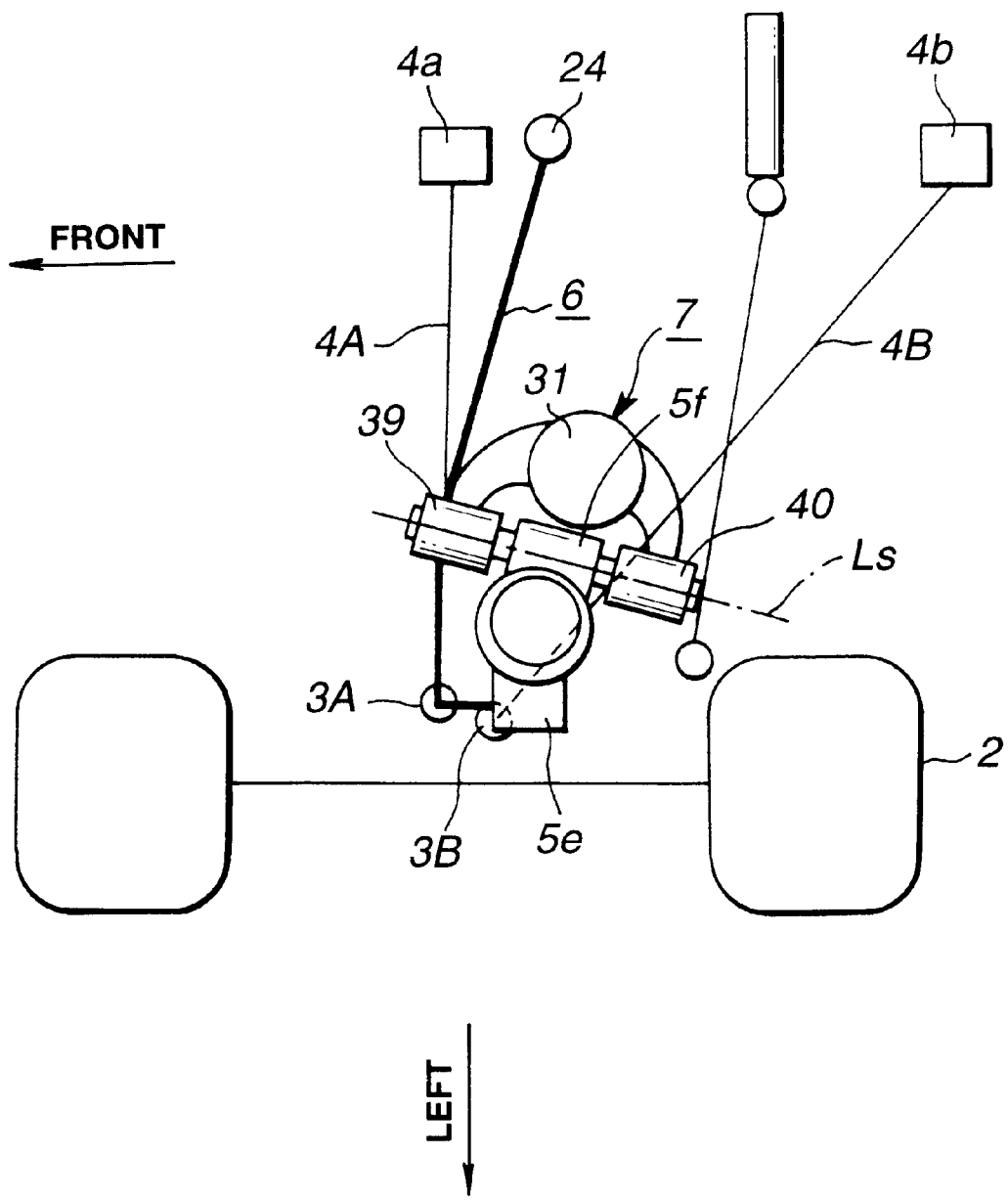
FIG. 15 is a schematic plan view of the front suspension of the second embodiment, taken from the above of an associated vehicle.

Alternatively, if desired, as is shown in FIGS. 14 and 15 which shows a front suspension of a second embodiment 100B of the present invention, the lower link 4 may comprise two I-shaped lower link parts, each having an outside end connected to the lower portion of the steering knuckle 1 through a ball-joint 3A or 3B and the other end supported to the vehicle body side member at a point 4a or 4b. In that case, an intersection line between a first imaginary plane PS1 which contains the point 4a, a center of the ball-joint 3A and the body connecting point "SP" and a second imaginary plane PS2 which contains the point 4b, a center of the ball-joint 3B and the body connecting point "SP" forms a virtual king pin axis "$L_K$" which does not pass through the ball-joints 3A and 3B. That is, in spite of interference with the other parts such as a brake rotor, the king pin axis "$L_K$" can be set in the most suitable position.

The contents of Japanese Patent Application 9-300588 filed Oct. 31, 1997 are hereby incorporated by reference.

What is claimed is:

1. A wheel suspension for a-front wheel of a motor vehicle having a vehicle body, comprising:

a wheel supporting member rotatably supporting said front wheel, said wheel supporting member having an upper portion and a lower portion;

a lower link having an outside end rotatably connected to said lower portion and an inside end swingably supported by the vehicle body;

a connecting member mounted on said upper portion of said wheel supporting member in such a manner as to rotate relative to said upper portion about a first axis ($L_K$), said first axis ($L_K$) being a king pin axis;

a shock absorber having an upper end pivotally connected to the vehicle body and a lower end connected to said connecting member;

an upper link having an inside end pivotally connected to the vehicle body and an outside end pivotally connected to said connecting member, said upper link defining a second axis (Lu) which passes through both the pivoted inside end of said upper link and the pivoted outside end of the same; and a tie rod connected to said wheel supporting member to pivot the same about said first axis, wherein said lower link and said upper link are arranged to exhibit negative camber characteristics upon bounding, and wherein said shock absorber is supported by said connecting member in a manner to pivot about a third axis (Ls), said third axis (Ls) being inclined with respect to a longitudinal axis of the vehicle in such a manner that a lateral distance of the third axis from the longitudinal axis increases as the third axis extends rearward.

2. A wheel suspension as claimed in claim 1, in which the pivoting connection between the inside end of said upper link and the vehicle body is made through one point and the pivoting connection between the outside end of said upper link and said connecting member is made through one point.

3. A wheel suspension as claimed in claim 2, in which said first axis (Lk) and said second axis (Lu) intersect with each other at a given point and in which said first axis (Lk) extends in the vicinity of the upper end of said shock absorber as viewed from the front of the vehicle.

4. A wheel suspension as claimed in claim 3, in which said upper link and said connecting member are connected through a first resilient bush, and in which said upper link and said vehicle body are connected through a second resilient bush.

5. A wheel suspension as claimed in claim 4, in which an axis of one of said first and second resilient bushes extends perpendicular to said second axis (Lu).

6. A wheel suspension as claimed in claim 1, in which a connection portion where the upper link and the connecting member are pivotally connected is positioned laterally outside of said first axis (Lk) as viewed from the front of the vehicle.

7. A wheel suspension as claimed in claim 1, in which said first axis passes through a limited area which contains a connection portion where the outside end of said lower link is pivotally connected to the lower portion of said wheel supporting member.

8. A wheel suspension as claimed in claim 1, in which said first axis ($L_K$) passes through a point where the outside end of said lower link is rotatably connected to the lower portion of said wheel supporting member, a center of a rotatable element of said connecting member and a point where the upper end of said shock absorber is pivotally connected to said vehicle body.

9. A wheel suspension as claimed in claim 1, in which said lower link comprises two lower link parts, each having an outside end pivotally connected to said lower portion of the wheel supporting member and an inside end pivotally connected to said vehicle body.

* * * * *